UNITED STATES PATENT OFFICE.

MORDUCH L. KAPLAN, OF BROOKLYN, NEW YORK.

GALVANIC CELL.

1,075,479.　　　　Specification of Letters Patent.　　　Patented Oct. 14, 1913.

No Drawing.　　　Application filed May 20, 1913.　Serial No. 768,870.

*To all whom it may concern:*

Be it known that I, MORDUCH L. KAPLAN, citizen of the United States, and resident of Brooklyn, in the county of Kings and State of New York, have invented certain new and useful Improvements in Galvanic Cells, of which the following is a specification.

The galvanic cells of the Leclanché type, as it is well known, contain manganese peroxid as a depolarizing agent which can be either of mineral origin or artificially obtained.

The usual methods for obtaining manganese peroxid or hydrated peroxid are described in "*Treatise on Chemistry*" by Roscoe and Scholemmer. The products obtained according to those methods, though superior to mineral manganese on account of their fine powdery state, show among others the following imperfections: (1) a low specific weight which makes it impossible to crowd sufficient material in a given space, which circumstance is of a great disadvantage especially in the manufacture of miniature cells; (2) the great difficulty of obtaining a product of uniform composition and free of alkali and acids, as already stated in the above-mentioned treatise.

I have discovered the following process, and have found the same to be the best and most practical for obtaining artificial hydrated manganese peroxid in a fine powdery state and at the same time of a comparatively high density: Manganese carbonate ($MnCO_3$) is subjected to a prolonged boiling with a diluted solution of potassium or sodium permanganate, which causes the following reaction:

$$3MnCO_3 + 2KMnO_4 = 5MnO_2 + K_2CO_3 + 2CO_2.$$

As soon as the evolution of $CO_2$ is completed, the boiling is discontinued and the formed peroxid is allowed to settle.

In order to insure the complete oxidation of the manganese carbonate a slight excess of permanganate should be used, which is, after completed reaction, removed by repeated decantation. After the disappearance of the red color of the permanganate the remaining peroxid is, for the purpose of removing the last traces of $Na_2CO_3$ or $K_2CO_3$ respectively, washed repeatedly with hot water, then collected on filters and dried. The resulting product is of a dark blue color and consists of a fine dense powder. Cells made in the usual ways with this material as a depolarizer give excellent results in respect to continuous service and show marvelous recuperative powers.

The advantages of the process invented by me over all known methods are (1) that by using a dense insoluble compound such as manganese carbonate, as a starting point, a dense fine powder of hydrated manganese dioxid is obtained retaining, to a certain extent, the original properties of the material started from; (2) no free alkali or acid is used or liberated during the reaction, which insures the resulting product being free of all injurious ingredients; (3) as analysis has shown the resultant product consists of pure or nearly pure hydrated manganese peroxid of the formula $2MnO_2 + 3H_2O$.

What I claim as my invention and desire to secure by Letters Patent, is:

1. A galvanic cell containing as a depolarizing agent sesquihydrated manganese peroxid.

2. A galvanic cell containing as a depolarizing agent hydrated manganese peroxid characterized by being a fine powder, dense and of dark blue color.

3. A process for obtaining hydrated manganese peroxid suitable for use as a depolarizer in a galvanic cell, comprising the oxidation of manganese carbonate.

4. A process for obtaining hydrated manganese peroxid suitable for use as a depolarizer in a galvanic cell, comprising the oxidation of manganese carbonate by a solution of a permanganate.

5. A process for obtaining hydrated manganese peroxid suitable for use as a depolarizer in a galvanic cell, comprising the oxidation of insoluble salts of manganese.

Signed at New York city, in the county of New York, and State of New York, this 19th day of May A. D. 1913.

MORDUCH L. KAPLAN.

Witnesses:
　ARTHUR MARION,
　CHAS. C. GILL.